(12) United States Patent
Sabelfeld et al.

(10) Patent No.: US 10,486,113 B2
(45) Date of Patent: Nov. 26, 2019

(54) FLUID DISTRIBUTION DEVICE FOR A GAS-LIQUID CONTACTOR, GAS-LIQUID CONTACTOR AND METHOD FOR ADDING A GAS TO A LIQUID

(71) Applicant: TECHNISCHE UNIVERSITAET BERLIN, Berlin (DE)

(72) Inventors: Marina Sabelfeld, Berlin (DE); Sven-Uwe Geissen, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 271 days.

(21) Appl. No.: 15/533,389

(22) PCT Filed: Dec. 7, 2015

(86) PCT No.: PCT/EP2015/078820
§ 371 (c)(1),
(2) Date: Jun. 6, 2017

(87) PCT Pub. No.: WO2016/091802
PCT Pub. Date: Jun. 16, 2016

(65) Prior Publication Data
US 2017/0333850 A1  Nov. 23, 2017

(30) Foreign Application Priority Data
Dec. 8, 2014  (DE) .......................... 10 2014 118 130

(51) Int. Cl.
*B01D 63/02* (2006.01)
*B01F 3/04* (2006.01)
(Continued)

(52) U.S. Cl.
CPC .......... *B01F 3/04262* (2013.01); *B01D 63/02* (2013.01); *B01F 3/04241* (2013.01);
(Continued)

(58) Field of Classification Search
CPC .............. B01D 63/02; B01D 2325/027; B01F 3/04241; B01F 3/04262; B01F 3/04468;
(Continued)

(56) References Cited

U.S. PATENT DOCUMENTS 3,204,682 A   9/1965  Teleshefsky et al.
4,132,637 A   1/1979  Key et al.
(Continued)

FOREIGN PATENT DOCUMENTS

DE        29804927       6/1998
DE      202006013661    12/2006
(Continued)

OTHER PUBLICATIONS

European Search Report for European Application No. EP 17194163.6, Completed by the European Patent Office, Dated Jan. 17, 2018, 8 Pages.
(Continued)

*Primary Examiner* — Lucas A Stelling
(74) *Attorney, Agent, or Firm* — Brooks Kushman P.C.

(57) ABSTRACT

A fluid distribution device for a gas-liquid contactor the device having a first side, a second side and a plurality of through-holes extending from the first side to the second side, through which holes a first fluid can flow. The fluid distribution device further having an interior, which is delimited by the first side and the second side and which is sealed in a fluid-tight manner in relation to the through-holes, a plurality of openings, which connect the interior to the second side, and a fluid connection, through which a second fluid can be introduced into or evacuated from the interior. A gas-liquid contactor having a fluid distribution device of this type and to a method for adding a gas to a liquid is also disclosed.

14 Claims, 3 Drawing Sheets

(51) Int. Cl.
    *B01F 5/04*     (2006.01)
    *C02F 1/44*     (2006.01)
    *C02F 1/78*     (2006.01)

(52) U.S. Cl.
    CPC ........ *B01F 3/04468* (2013.01); *B01F 5/0456* (2013.01); *B01F 5/0465* (2013.01); *C02F 1/44* (2013.01); *C02F 1/78* (2013.01); *B01D 2325/027* (2013.01); *B01F 2003/04319* (2013.01); *B01F 2003/04404* (2013.01); *B01F 2003/04886* (2013.01); *B01F 2215/0052* (2013.01); *C02F 2303/16* (2013.01)

(58) Field of Classification Search
    CPC .................. B01F 5/0456; B01F 5/0465; B01F 2003/04319; B01F 2003/04404; B01F 2003/04886; B02F 2215/0052; C02F 1/44; C02F 1/78; C02F 2303/16
    See application file for complete search history.

(56) References Cited

U.S. PATENT DOCUMENTS

| | | | |
|---|---|---|---|
| 4,664,681 A | 5/1987 | Anazawa et al. | |
| 4,781,889 A | 11/1988 | Fukasawa et al. | |
| 4,818,447 A | 4/1989 | Iwasaki | |
| 4,992,216 A | 2/1991 | Saita et al. | |
| 5,254,143 A * | 10/1993 | Anazawa ............ | B01F 3/04468 95/46 |
| 5,388,906 A | 2/1995 | Rao | |
| 5,464,480 A | 11/1995 | Matthews | |
| 5,670,094 A | 9/1997 | Sasaki et al. | |
| 5,749,941 A | 5/1998 | Jansen et al. | |
| 6,126,819 A | 10/2000 | Heine et al. | |
| 6,132,079 A | 10/2000 | King | |
| 6,162,359 A | 12/2000 | Andre et al. | |
| 6,253,539 B1 | 7/2001 | Farhangi et al. | |
| 6,402,818 B1 | 6/2002 | Sengupta | |
| 6,582,496 B1 | 6/2003 | Cheng et al. | |
| 6,616,841 B2 | 9/2003 | Cho et al. | |
| 6,921,482 B1 | 7/2005 | Cheng et al. | |
| 2006/0081524 A1 | 4/2006 | Sengupta et al. | |
| 2010/0024651 A1 | 2/2010 | Bansal | |
| 2013/0140232 A1 | 6/2013 | Fabiyi et al. | |

FOREIGN PATENT DOCUMENTS

| | | |
|---|---|---|
| DE | 102009026278 | 4/2010 |
| EP | 0451715 | 10/1991 |
| EP | 1485193 | 9/2007 |
| EP | 1864709 | 8/2011 |
| JP | 62292604 A | 12/1987 |
| JP | H07213880 | 8/1995 |
| JP | 9285794 A | 11/1997 |
| JP | 2001157828 | 6/2001 |
| JP | 2003245525 A | 9/2003 |
| WO | 9607471 | 3/1996 |
| WO | 9832522 | 7/1998 |
| WO | 2008028626 | 3/2008 |
| WO | 2009035334 | 3/2009 |
| WO | 2011084665 | 7/2011 |

OTHER PUBLICATIONS

Janknecht, Water Quality and Waste Management Technical University Munich 2001, Report No. 167, 63 Pages, "Characterization of Ozone Transfer into Water through Porous Membranes".
International Search Report for PCT/EP2015/078820, English translation attached to original, Both completed by European Patent Office on Mar. 15, 2016, All together 9 Pages.
Abegglen et al. Dubendorf Eawag, 2009, 87 Pages, English abstract attached to original, "Ozonation as an advanced treatment for micropollutant removal was tested full scale on the wastewater treatment plant WWTP Regensdorf during 16 months. This experiment has been conducted within the project, Strategy Micropoll of the Swiss Federal Office for the Environment FOEN. Ozonation eliminated a broad range of organic micropollutants and various eco toxicological effects. The pilot study also showed that the implementation of an ozonation step in an existing WWTP is feasible, both technically and economically".
Ante et al. Frankfurt am Main DECHEMA, 2014, English abstract attached to original, 46 Pages, "Trends und Perspektiven in der industriellen Wassertechnik. Positionspapier der ProcessNet-Fachgruppe Producktionsintegrierte Wasser-und Abwassertechnik". English Translation of Title Trends and Perspectives in the industrial Water technology. Position paper of the ProcessNet group integrated production Water and Wastewater Technology.
Bamperng et al. Separation and Purification Technology 2010, vol. 72, pp. 186-193, "Ozonation of dye wastewater by membrane contactor using PVDF and PTFE membranes".
Bierbaum, PTS Forschungsbericht IGF 15372, MUnchen, 2010, 38 Pages, English abstract attached to original, "Einsatz der Ozontechnologie zur weitergehenden Reinigung von Abwassern aus Prouktionen ohne Altpapiereinsatz". English Translation of Title Use of ozone technology to the further Cleaning of sewage from productions without use of waste paper.
Cameron, Cameron Process Systems 2010, 2 Pages, "Datasheet. CYNARA CO2 membrane separation solutions Acid gas CO2 separation systems with CYNARA membranes".
Domininghaus et al. In Die Kunststoffe und ihre Eigenschaften. 6th ed. Berlin, Springer, 2005.S. 848-869, English abstract attached to original, "Polytetrafluorethylen PTFE".
Dupont, Wilmington DuPont Fluoropolymers, 2010, 14 Pages, "A New Generation of Teflon Fluorocarbon Resins For High Performance".
Gabelman et al. Journal of Membrane Science 1999, vol. 159, pp. 60-106, "Hollow fiber membrane contactors".
Gottschalk et al. Weinheim WILEY VCH, 2010, 12 Pages, "Ozonation of water and waste water, a practical quide to understanding ozone and its applications".
Grunebaum, Essen Ministerium fur Klimaschutz, Umwelt, Landwirtschaft, Natur und Verbraucherschutz des Landes Nordrhein Westfalen, 2011 Translation Food Ministry of Agriculture Climate protection, environment, Agriculture, nature and consumer protection of the state of North Rhine Westphalia, 2011, English Translation attached to original, 207 Pages, "Elimination of Drug Residues in municipal sewage treatment plants".
Helble, Water Science and Technology 1999, vol. 40, No. 11-12, pp. 343-350, "Advanced effluent treatment in the pulp and paper industry with a combined process of ozonation and fixed bed biofilm reactors".
Jansen, University of Twente 2005 Dissertation, 224 Pages, "Ozonation of humic substances in a membrane contactor".
Kaindl, Dissertation, Technische Universitat Wien, 2008, Uploaded in 3 Parts, All together 305 Pages, English Abstract attached to original Document, "Advanced purification of mechanical and biological pre treated paper mill effluent by ozonation and subsequent biofiltration".
Knauer, Arura 2012, English Translation attached to original document, All together 43 Pages. "Degasser DG 2 1S User Manual V6880".
Leiknes et al. Chemical Engineering Journal 2005, vol. 111, pp. 53-61, "Ozone transfer and design concepts for NOM decolorization in tubular membrane contactor".
Melin et al. Membrane Processes 2007, Uploaded in 7 Parts, All together 590 Pages, English Abstract attached to original Document, "Basic of Module and Plant Design".
Membrana GmbH 2012, 6 Pages, English Abstract attached to original Document, "Liqui Cel Membrane Contactors, Product Information".
Mobius, Waste water of the paper and pulp industry 2010,Uploaded in 3 Parts, All together 349 Pages, English Abstract attached to original Document, "Waste water from the pulp and paper industry Biological purification of sewage from the production of paper and pulp".

(56) References Cited

OTHER PUBLICATIONS

Munlv, Status report of the "Pure Ruhr" Program Dusseldorf The Ministry for environment and Natural reserve, Agriculture and consumer protection North Rine Westphalia Of 2010, 31 Pages, English Abstract attached to original document, "Strategy for the improvement of the Water and drinking water quality".

O'Brien et al. Organic Letters 2010, vol. 12, No. 7, pp. 1596-1598, "Flow ozonolysis using a semipermeable Teflon AF2400 membrane to effect gas-liquid contact".

Pinnau et al. Journal of Membrane Science 1996, vol. 109, pp. 125-133, "Gas and vapor transport properties of amorphous perfluorinated copolymer membranes based on 2, 2 bistrfluoromethyl 4,5 difluoro 1,3 dioxole itetrafluoroethylene".

Pinnekamp, WEPA, Giershagen, Germany, 2007, 239 Pages, English Abstract attached to original document, "Use of advanced purification technologies for reducing COD pollution and recycling wastewater in the production of hygienic wastepaper at the company WEPA, Giershagen".

Ruttel et al. Air Products and Chemicals. Inc., 1999. Knowledge Paper No. 3., 24 Pages, "Ozone technical aspects of its generation and use".

Sabelfeld et al. DECHEMA, DWA Industrial Water Technologies 2013, 12 Pages, English Abstract attached to Original Document, "Use of membrane contactors for water ozonation".

Schmidt et al. Ettringen, Germany, 2000, Konferenzbeitrag TAPPI, Konferenz, S., 12 Pages, "Treatment of Paper Mill Effluent by the Use of Ozone and Biological Systems Large Scale Application at Lang Paper, Ettringen, Germany".

Simstich et al. PTS New 2009, 5 Pages, "10 Years of Advanced Waste Water Treatment by Ozone and Membrane Filtration, Which Method Ranks First Today".

Simstich, PTS The Paper Technology Specialists 2010, 41 Pages, English Abstract attached to original document, "investigations on the trouble free operation biological Cleaning equipment Recycling Nanofiltration retentates".

Steiner et al. EAWAG. Denver, Water Research Foundation 2010, 69 Pages, "Use of membrane contactors for the diffusion of ozone".

Sirkar et al. Bioseparation in foods 1995, 2 pages, "membrane separations, new concepts and applications for the food industry".

European Commission Environment ec.europa.eu.http://ec.europa.eu/environment/water/waterdangersub/pri_substances.htm Retrieved Aug. 2, 2017, 2 Pages, "Priority substances under the Water Framework Directive".

* cited by examiner

FLUID DISTRIBUTION DEVICE FOR A GAS-LIQUID CONTACTOR, GAS-LIQUID CONTACTOR AND METHOD FOR ADDING A GAS TO A LIQUID

CROSS-REFERENCE TO RELATED APPLICATION

This application is the U.S. national phase of PCT Application No. PCT/EP2015/078820 filed on Dec. 7, 2015, which claims priority to DE Patent Application No. 10 2014 118 130.1 filed on Dec. 8, 2014, the disclosures of which are incorporated in their entirety by reference herein.

The present invention relates to a fluid distribution device according to the preamble of claim 1, to a gas-liquid contactor according to the preamble of claim 5, and to a method for adding a gas to a liquid according to the preamble of claim 12.

Various fields of application in which it in necessary for a gas to be added to a liquid are known from the prior art. For example, the ozonization (also referred to as ozonation) of drinking, process, and waste water is performed for the purpose of oxidizing organic substances that are not readily biodegradable, and for disinfection. Often, adding a gas to a liquid is performed by a distribution of the gas in the form of fine bubbles in the liquid by means of a Venturi injector system, gassing by a candle, gassing in columns, or by gassing by way of rotating mixers.

Bubble-free gassing systems in which membrane contactors are employed are also known from the prior art. When respective operating conditions relating to pressure to be maintained are adhered to, foaming which often results in the case of an introduction of gas with fine bubbles into the liquid is avoided by membrane contactors of this type. Moreover, membrane contactors offer the advantage that no liquid droplets and the substances that are dissolved therein are entrained by gas bubbles. If membrane contactors are employed as gas-liquid contactors, the energy requirement necessary for gassing drops since membrane contactors have a lower pressure loss than other gas-liquid contactors such that less energy is required for conveying the liquid. Moreover, membrane contactors have a substantially lower requirement in terms of space than other gas-liquid contactors. The membrane that is employed in membrane contactors of this type, when operated in a correspondingly bubble-free manner, serves as a transportation barrier for substances contained in the liquid and for liquid vapor such that the exhaust phase is burdened with less liquid and fewer contaminants than is the case with classic (dispersing) gas-liquid contactors.

In most cases, membrane contactors are constructed from hollow fibers that are disposed so as to be mutually parallel, wherein either the liquid to which gas is to be added flows in the interior of the hollow fiber, and the gas flows about the hollow fiber, or else the liquid to which gas is to be added flows about the hollow fibers, and the gas flows through the hollow fibers. When the interior of the hollow fibers is perfused by a liquid to which gas is to be added, the issue of the hollow fibers clogging up often arises, in particular in the case of liquids which are contaminated with suspended solids (such as waste water, for instance).

By contrast, when the liquid flows through a membrane contactor on the outside of the hollow fibers, the membrane contactors known from the prior art have unfavorable flow profiles for the liquid phase.

European patent EP 1 485 193 B1, for example, thus describes a membrane contactor in which the liquid to which gas is to be added is induced into the membrane contactor by way of a lateral connector and is directed out of the membrane contactor again by way of another lateral connector. On account thereof, more deficient perfusion in the peripheral zones of the membrane contactor results, on the one hand, such that dead zones are formed. Moreover, a complex interior design of the membrane contactor is necessary in order for the counter pressure that is built up by the hollow fibers when the liquid is induced to be reduced. To this end, the aforementioned European patent provides the use of spacers which are intended to enable an improved inflow of the liquid to which gas is to be added into the membrane contactor, at least in a region that is spatially proximal to the induction port. Spacers of this type or other installations cause a higher pressure loss when conveying liquid through the module, and do not solve the issue of the insufficiently perfused peripheral zones in the module.

A membrane contactor for degassing a liquid is known from U.S. Pat. No. 6,402,818 B1. The liquid to be degassed herein is introduced into a cavity between the individual hollow fibers of the membrane contactor by way of a distribution tube that is centrically disposed in the membrane contactor and is discharged from the membrane contactor in a manner perpendicular to the hollow fibers. On account thereof, a radial flow of the liquid phase that is transverse to the hollow fibers results, the latter per se being disposed parallel with the liquid distribution tube. The result thereof is an overall reduced dwell time of the liquid in the membrane contactor and thus a reduced contact time between the liquid phase and the gas phase. Moreover, the pressure loss in the case of a transverse incident flow of the hollow fibers is substantially higher as compared to a parallel incident flow, such that the transportation of the liquid is associated with a higher energy input.

A further issue that is unsolved in the prior art is the economy of a method for exposing water and other liquids to ozone. Thus, when ozone or an ozone-containing gas is induced into a liquid, the gas phase that flows out therefrom as an exhaust gas continues to contain large quantities of as yet unutilized oxygen. However, about two thirds of the energy costs of such a method for exposing a liquid to ozone pertain to the production of oxygen. Oxygen recovery is indeed already proposed in U.S. Pat. No. 4,132,637 A, but it has been demonstrated that the service life of an ozone generator which is operated according to the method described in this US patent is comparatively short.

The present invention is based on the object of overcoming the disadvantages that are known from the prior art. In particular, a possibility for improving the flow conditions in a gas-liquid contactor, in order for the efficiency of the gas-liquid contactor to be increased, is to be provided. The present invention is thus based on the object of specifying a device and a method for increasing the efficiency when gassing liquids.

This object is achieved by a fluid distribution device for a gas-liquid contactor having the features of claim 1. A fluid distribution device of this type has a first surface or a first side, respectively, and a second surface or a second side, respectively. Furthermore, numerous through bores which extend from the first side to the second side and through which a first fluid can flow are provided in the fluid distribution device. This means that these through bores are permeable to the first fluid. These through bores can typically be macroscopically visible through bores through which a liquid as a first fluid can flow.

The fluid distribution device is distinguished in that said fluid distribution device has an interior space which, on the one hand, is delimited by the first side and by the second side and, on the other hand, is designed to be fluid-tight in relation to the through bores. The fluid distribution device thus has a cavity-type design embodiment, wherein the cavity is populated with through bores which however are not in fluid communication with the cavity. The first fluid which can flow through the through bores can consequently not penetrate the interior space of the fluid distribution device by way of the through bores.

The fluid distribution device furthermore has numerous openings which connect the interior space to the second side. This means that the interior space of the fluid distribution device is not hermetically sealed but by way of the second side is in fluid communication with an external region of the fluid distribution device.

The fluid distribution device finally has a fluid connector through which a second fluid can be introduced into the interior space or be discharged from the interior space. The second fluid is typically a gas. If the latter is introduced into the interior space of the fluid distribution device by way of the fluid connector, said gas can subsequently flow out of the interior space of the fluid distribution device. The fluid distribution device herein ensures that the first fluid and the second fluid are not mixed with one another. Rather, in the intended operation of the fluid distribution device, the first fluid exits the through bores on the second side of the fluid distribution device, while the first fluid exits the interior space of the fluid distribution device on the second side of the fluid distribution device. Contact of the first fluid with the second fluid can take place subsequently, if and when desired.

The fluid distribution device is made from a material that is permeable to neither the first fluid nor the second fluid. Metals and plastics are suitable materials for making the fluid distribution device, wherein a design embodiment of the fluid distribution device that is inert to those fluids that are intended to flow through the fluid distribution device is preferred.

In one variant, the first side and the second side of the fluid distribution device have a base area of identical design. The enables a particularly simple production of the fluid distribution device.

In one further variant, the first side and the second side of the fluid distribution device each have a circular-type base area. The term "circular-type" herein comprises both "circular" as well as "oval". Since the first side is spaced apart from the second side, the fluid distribution device in this variant has a cylindrical overall design. This means that an encircling cylindrical sleeve is configured between the first side and the second side. Depending on the spacing of the first side from the second side (and thus depending on the height of the cylindrical sleeve), this results in a variable volume of the interior space of the fluid distribution device. However, since the fluid distribution device is not employed for storing fluid but for distributing fluid, it is not necessary for said fluid distribution device to have a particularly large volume. Rather, said fluid distribution device can be designed to be relatively flat, as long as the space that is available to the fluid that flows through the interior space can still ensure good flow conditions.

A circular-type base area has the advantage that a fluid distribution device designed in such a manner can be readily attached to the end of a gas-liquid contactor that is designed as a membrane contactor, since membrane contactors of this type typically likewise have a cylindrical design and thus a circular-type or circular base area. The dimensions of the fluid distribution device herein are preferably adapted to the dimensions of the membrane contactor on which the fluid distribution device is intended to be employed. This means that the base area of the first side and that of the second side of the fluid distribution device in each case correspond substantially to the base area of the gas-liquid contactor on which the fluid distribution device is to be employed.

In one variant, the through bores have a diameter which is larger than a diameter of the openings. The through bores are thus particularly suitable for conducting a liquid, while the openings are particularly suitable for conducting a gas. Both the through bores as well as the openings of the fluid distribution device herein can have the same design. A circular-type design embodiment of the through bores and of the openings is provided in particular. A circular-type, in particular circular, design embodiment of this type can be particularly readily implemented in terms of production technology, and significantly reduces the production complexity of the fluid distribution device.

In one further variant, the fluid connector is disposed on a lateral circumference of the fluid distribution device. When the fluid distribution device has a cylindrical design, the lateral circumference is a circular sleeve of the cylinder. On account thereof, the second fluid can be introduced laterally into the fluid distribution device, while the first fluid can be introduced from the first side frontally into the through bores of the fluid distribution device. In particular, the fluid connector can be disposed in such a manner that a direction of longitudinal extent of the fluid connector is disposed at an angle of approximately 90° (that is to say at an angle from 85° to 95°, in particular 88° to 92°) in relation to the first side, or to the second side, respectively. On account thereof, the direction in which the second fluid flows into the fluid distribution device would be approximately perpendicular to the direction in which the first fluid flows into the fluid distribution device. By contrast, during the operation of the fluid distribution device, both fluids flow out from the second side of the fluid distribution device in the same direction. Were the fundamental flow directions of the two fluids during the operation of the fluid distribution device to differ (counter-flow operation), the second fluid would flow into the fluid distribution device so as to be exactly parallel and counter to the outflowing first fluid, and subsequently would flow out of the fluid connector of the fluid distribution device in a manner approximately perpendicular to the inflow direction of the first fluid into the through bores of the fluid distribution device.

As has already been explained, the fluid distribution device is provided and configured for being connected to a gas-liquid contactor in order to ensure optimized flow conditions for the fluids that flow through the gas-liquid contactor. The present invention therefore also relates to a gas-liquid contactor having a housing in which a multiplicity of hollow fibers are disposed and in which a space that surrounds the hollow fibers is configured. The individual hollow fibers herein are preferably aligned so as to be mutually parallel. The hollow fibers serve for enabling a gas phase and a liquid phase to be placed in mutual contact in the gas-liquid contactor. For this purpose, the hollow fibers are made from a water-repellant material such that the pores of the hollow-fiber membrane are preferably filled by gas rather than water. Pressure that is respectively applied to the gas and the water side likewise ensures that neither liquid ingresses into the pores nor gas enters the liquid in the form of bubbles. In this way, a bubble-free diffusing input of gas into a liquid that flows about the hollow fibers can be achieved when the hollow fibers are perfused by a gas.

The gas-liquid contactor is distinguished in that said gas-liquid contactor has a fluid distribution device according the preceding explanations. The flow conditions of the fluids that flow through the gas-liquid contactor (specifically the liquid to which a gas is to be added, and the gas which is to be added to the liquid) are optimized on account thereof. On account thereof, the energy requirement of a gas-liquid contactor of this type is significantly reduced in comparison to conventional gas-liquid contactors, and also in comparison to conventional membrane contactors. A reduction in the counter pressure which the liquid to which gas is to be added has to overcome when flowing in order to achieve a defined degree of enrichment by the gas is thus achieved by optimizing the flow conditions. Consequently, the energy requirement that is necessary for the transportation of the liquid is also less than in the case of a higher counter pressure. Moreover, the efficiency of the gas input into the liquid to which the gas is to be added increases since both the entire length of the hollow fibers as well as all of the hollow fibers are placed into uniform contact with the flowing liquid to which the gas is to be added. This means that the membrane area of the hollow fibers that is available for the gas input into the liquid is larger than in the case of membrane contactors that are not optimized in terms of flow.

In one variant, the gas-liquid contactor extends along a direction of longitudinal extent, from a first end to a second end. The fluid distribution device herein is disposed on the first end or on the second end of the gas-liquid contactor. In this way, it is particularly readily possible for the fluids that are to be directed through the gas-liquid contactor to be induced into the contactor in a way that is optimized in terms of flow technology already at the entry to the gas-liquid contactor.

In one further variant, the gas-liquid contactor has two fluid distribution devices, wherein the one fluid distribution device is disposed on the first end and the other fluid distribution device is disposed on the second end of the gas-liquid contactor. It is thus possible for the fluids that are to be directed through the gas-liquid contactor to be induced into the gas-liquid contactor in a way that is optimized in terms of flow technology, on the one hand, and for said fluids to also be directed out of the gas-liquid contactor in the same way, on the other hand. A flow of the fluids through the gas-liquid contactor that is overall optimized in terms of flow technology results on account thereof, such that a particularly high efficiency of the contactor in terms of the energy necessary for the operation and in terms of the membrane surface that is necessary for in input of gas into the liquid is achieved. Moreover, it is readily possible for the flow direction in the membrane contactor to be changed on demand.

In one variant, the gas-liquid contactor has two flanges which are disposed on the outboard ends of the gas-liquid contactor such that a sandwich-type structure results on the ends of the gas-liquid contactor. One flange herein is disposed so as to be extremely outboard, the fluid distribution device and subsequently the housing of the gas-liquid contactor having the hollow fibers following in succession. The two ends of the gas-liquid contactor herein are designed in the same way. In other words, the flanges are in each case disposed on a side of the fluid distribution device that in the direction of longitudinal extent of the gas-liquid contactor is outboard. The flanges herein serve for connecting the gas-liquid contactor to a line system. By way of flanges of this type it is possible for the gas-liquid contactor that is equipped with one or with two fluid distribution devices to be particularly readily integrated in an existing line system.

On account thereof, the liquid to which the gas is to be added can flow through the gas-liquid contactor without any deflection by deflector plates, hollow-fiber mats, or a transverse incident flow to the hollow fibers of the gas-liquid contractor. A pressure loss that would arise otherwise is avoided in this way, and a risk of clogging of the gas-liquid contactor is reduced. A sufficiently long contact time between the gas phase and the liquid phase is guaranteed by the parallel flow of the liquid in relation to the hollow fibers of the gas-liquid contactor, such that a substantial depletion of the gas phase takes place. In other words, the component parts of the gas phase that are to be introduced into the liquid are actually introduced into the liquid at a high proportion.

By means of the flanges that are disposed in the longitudinal direction of the gas-liquid contactor a portion of an existing pipeline system can be readily replaced by the gas-liquid contactor described herein, for example. The portion herein preferably has a length up to 3 meters, in particular up to 2.5 meters, in particular up to 2 meters, in particular up to 1.5 meters, in particular up to 1 meter, in particular up to 0.8 meter, in particular up to 0.5 meter, and in particular up to 0.3 meter. This means that the gas-liquid contactor has a length of 0.3 meter to 3 meters, for example, in particular 0.5 meter to 2.5 meters, in particular 0.8 meter to 2 meters, and in particular 1 meter to 1.5 meters. It is thus not necessary for an additional flow path to be provided for gassing of the liquid; rather, the already existing flow path in the pipeline system can be utilized. On account thereof, an additional space allocation for the gas-liquid contactor is also not required.

When a gas which is intended to subsequently initiate a chemical reaction in the liquid is induced into the liquid, and the dwell time therefor in the membrane contactor is not sufficient, it is advantageous for a pipe portion of the pipeline system that follows the gas-liquid contactor to be made from a material that is resistant to the gas induced. For example, depending on the type of the liquid into which the ozone is being induced, when ozone from an ozone-containing gas is intended to be induced into a liquid, ozone that has not yet reacted can potentially flow conjointly with the liquid through the pipeline system. It is then expedient for a pipeline portion that follows the gas-liquid contactor to be made from an ozone-resistant material, in order for damage to the pipeline system by the ozone to be avoided.

When the liquid to which the gas is to be added enters the gas-liquid contactor by way of a fluid distribution device according to the explanations above, said liquid is distributed uniformly across the entire cross section of the gas-liquid contactor and passes the contactor in the form of a plug flow. A deficient flow distribution as arises in the case of the membrane contactors that are known from the prior art (formation of dead zones and short-circuiting flows) is avoided in this way such that the interior volume of the gas-liquid contactor is utilized in the best possible manner.

In one variant, the ratio of the length of the gas-liquid contactor to the diameter of the gas-liquid contactor is more than 5:1, in particular more than 8:1, in particular more than 10:1, in particular more than 12:1, in particular more than 15:1, and most particularly more than 20:1. In particular, a ratio range of 8:1 to 20:1, in particular 10:1 to 18:1, and most particularly 12:1 to 15:1 is provided herein. In this manner, a sufficiently long contact time between the gas phase and the liquid phase is guaranteed. The efficiency of the gas input can moreover be increased when the liquid flows through the gas-liquid contactor at a high overflow velocity. The overflow velocity herein is preferably selected in such a manner that said overflow velocity is in the magnitude of the flow velocities in the pipes of a line system in which the gas-liquid contactor is embedded. For this purpose, the available cross section in the gas-liquid contactor preferably corresponds to approximately the pipeline cross section of the pipeline system in which the gas-liquid contactor is disposed. Consequently, the cross section of the gas-liquid contactor in this instance is larger than the cross section of the preceding and/or of the succeeding pipe section by such an amount that corresponds to the proportion of the hollow fibers in the gas-liquid contactor (number of the hollow fibers multiplied by the cross section of the hollow fibers). An additional pressure loss at the fluid distribution device is largely avoided by selecting an available cross section in the gas-liquid contactor that is sufficiently large in such a manner, such that the gas-liquid contactor can be integrated in a pre-existing plant in the best possible way. The liquid in this instance can flow through the gas-liquid contactor at a velocity that is comparable to that in the pipelines ahead of the gas-liquid contactor.

In one variant, the fluid distribution device is disposed in the gas-liquid contactor in such a manner that the through bores of the fluid distribution device are in fluid communication with only the space that surrounds the hollow fibers, and that the openings of the fluid distribution devices are in fluid communication with only an interior region of the hollow fibers. For this purpose, the hollow fibers can be fixedly connected to the fluid distribution device. A fixed connection of this type can be achieved by welding, adhesive bonding, or implanting, for example. As a result, a liquid which enters the gas-liquid contactor by way of the through bores of the fluid distribution device can flow only through the space which surrounds the hollow fibers. However, the liquid can under no circumstances enter the interior region of the hollow fibers. By contrast, a gas that enters the gas-liquid contactor from the openings of the fluid distribution device can flow only into the interior region of the hollow fibers, but not into the space that surrounds the hollow fibers. In this way, a clear separation in terms of flow technology is thus achieved between the liquid to which the gas is to be added, on the one hand, and the gas that is used for adding to the liquid, on the other hand. The space which surrounds the hollow fibers determines the internal volume of the gas-liquid contactor that is available to the liquid that flows around the hollow fibers from the outside. As has been explained above, this internal volume is preferably adapted to the pipeline cross section of a line system in which the gas-liquid contactor is integrated.

In one variant, the arrangement of the hollow fibers in the gas-liquid contactor is adapted to the arrangement of the openings and through bores of the fluid distribution device in such a manner that the hollow fibers are disposed in a regular pattern about the through bores of the fluid distribution devices. In this way, an optimized flow of the liquid to which the gas is to be added through the gas-liquid contactor is achieved, on the one hand. Moreover, a best possible transition of gas into the liquid to which the gas is to be added is also enabled, on the other hand, since the surface of the hollow fibers that serves for exchanging gas is distributed uniformly about the liquid in flow.

In one variant, the hollow fibers are distributed uniformly across the cross section of the entire gas-liquid contactor. This simplifies the production of the gas-liquid contactor.

The hollow fibers preferably have an internal diameter of 0.05 to 20 mm, in particular 0.1 to 15 mm, in particular 0.5 to 12 mm, in particular 1 to 10 mm, and most particularly 2 to 8 mm.

The housing of the gas-liquid contactor can comprise, for example, polytetrafluoroethylene (PTFE), polyvinylidene fluoride (PVDF), polyvinyl chloride (PVC), in particular rigid PVC (PVC-U), and/or stainless steel, or be composed entirely of these materials or from mixtures of these materials, respectively. The aforementioned materials are ozone-resistant materials such that a gas-liquid contactor that is designed in such a manner is suitable for employment in the context of the ozonization of a liquid.

In one variant, the hollow fibers have a membrane having a porous hydrophobic material. Said hollow fibers are preferably composed entirely of a porous hydrophobic material of this type. Suitable porous hydrophobic materials have a pore diameter of 0.001 to 50 µm, in particular 0.002 to 30 µm, in particular 0.005 to 20 µm, in particular 0.01 to 10 µm, and most particularly 0.05 to 1 µm. Suitable materials are PTFE, fluorinated ethylene propylene (FEP), and/or perfluoroalkoxy alkane (PFA) or a mixture of these materials. In one variant, the membrane can be composed entirely of the aforementioned materials or mixtures thereof. A gas input into the liquid to which gas is to be added would in this instance be performed by a diffusion of gas through the pores of the membrane.

A material is considered hydrophobic when said material has a contact angle with water of more than 90°, in particular more than 95°, in particular more than 100°, in particular more than 110°, and most particularly more than 120°.

In one alternative design embodiment, the hollow fibers have a membrane having a pore-free and gas-permeable hydrophobic material. A material of this type is considered gas-permeable when said material has a gas permeability to the respective gas of more than 100 Barrer, in particular more than 200 Barrer, in particular more than 300 Barrer, in particular more than 400 Barrer, and most particularly more than 500 Barrer. The amorphous fluoropolymer that is marketed by the DuPont corporation under the trade name of Teflon AF is a suitable gas-permeable hydrophobic material, for example, in particular when the gas to be employed is ozone. The materials Teflon AF 1600 and Teflon AF 2400 are particularly suitable herein, for example.

The invention also relates to a method for adding a gas to a liquid, using a gas-liquid contactor according to the preceding explanations. This method is distinguished by the steps explained hereunder. First, a liquid to which gas is to be added is induced into a space which surrounds hollow fibers of a gas-liquid contactor. This means that it is provided in the context of the method presently described and claimed that the liquid to which the gas is to be added flows about the hollow fibers of a membrane contact from the outside. A gas is furthermore induced into the hollow fibers of the gas-liquid contactor. Now, both the gas as well as the liquid to which the gas is to be added are allowed to flow through the gas-liquid contactor. On account thereof, a gas exchange takes place across the membrane of the hollow fibers such that a liquid to which gas has been added is ultimately obtained.

In principle, the liquid and the gas herein can flow through the gas-liquid contactor in the same flow direction. However, it is provided in one variant that the liquid to which the gas is to be added and the gas flow through the gas-liquid contactor in a mutual counter flow. On account thereof, particularly advantageous gradients which facilitate a transfer of the gas through the hollow-fiber membrane into the liquid result in this instance.

In one variant, the method is the method is carried out in such a manner that a liquid pressure of the liquid to which the gas is to be added is higher than a gas pressure of the gas.

This variant is applied in particular when the hollow fibers have a membrane having a porous hydrophobic material.

In one further variant, the method is carried out in such a manner that the liquid pressure of the liquid to which the gas is to be added is lower than a gas pressure of the gas which is to be introduced into the liquid. This variant is particularly expedient when the hollow fibers have a membrane having a pore-free and gas-permeable hydrophobic material.

In both cases, the gas by virtue of the partial pressure differential between the gas, on the one hand, and the liquid to which the gas is to be added, on the other hand, diffuses through the membrane. The gas input into the liquid herein is performed in a bubble-free manner, as is generally usual in the case of membrane contactors.

The method presently described can be particularly preferably employed for adding ozone to a liquid. This means that the liquid to which gas is to be added is preferably a liquid to be exposed to ozone. Furthermore, the gas to be introduced into the liquid is preferably an ozone-containing gas. An ozonization of a liquid is expedient for disinfecting water or for treating industrial or domestic waste water.

The gas-liquid contactor described herein and the method described herein are particularly suitable for the ozonization of mechanically and biologically pre-treated waste water, the objective being the oxidation of refractory substances contained in the waste water and/or disinfection, for the ozonization of phreatic water and surface water for the purpose of purification of potable water, the objective being the disinfection and the oxidation of refractory substances contained in the water, for the ozonization of process water, the objective being the oxidation of organic substances, and for the ozonization in the context of the production of ultrapure water having very high quality requirements and highly concentrated bubble-free ultrapure ozone water solutions which are set in the production of circuit boards or in the pharmaceutical industry, for example. The water to be exposed to ozone herein can have a solids content of up to 100 mg/l without clogging or other operational malfunctions of the gas-liquid contactor that is employed arising. The solids content is in particular 50 mg/l maximum, in particular 45 mg/l maximum, in particular 40 mg/l maximum, in particular 30 mg/l maximum, in particular 25 mg/l maximum, and most particularly 20 mg/l maximum. This applies in the same way to liquids to which other gases are to be added.

As has been mentioned at the outset, an ozone-containing gas which exits from the fluid connector from the gas-liquid contactor often still has large quantities of non-utilized oxygen. Therefore, in order for energy to be saved, it is advantageous for this oxygen after a corresponding treatment to be re-supplied to an ozone generator, so as to generate fresh ozone-containing gas. Alternatively, the non-recycled oxygen can also be supplied to the biological waste-water treatment pond of a waste water treatment plant, so as to improve the supply of oxygen to the biomass. In the case of the latter application, no particular requirements are to be set for the exhaust gas; the ozone content should merely be reduced to a minimum amount or be set to zero by destroying residual quantities of ozone.

By contrast, if the oxygen-containing exhaust gas is intended to be re-supplied to an ozone generator, attention should be paid to a respective exhaust gas treatment according to the prior art in terms of the reduction of the content of water vapor and organic carbon, such that the service life of the ozone generator is not compromised by a re-use of the oxygen-containing exhaust gas.

The invention therefore also describes a suitable method according to the prior art for treating the exhaust gas of an oxygen-containing gas that exits from a gas-liquid contactor, said method comprising the steps as explained hereunder, wherein by contrast to the prior art a gas-liquid contactor according to the explanations above can be employed, and some method parameters can be modified as compared to known parameters. This method herein can be part of the previously explained method for adding a gas to a liquid. This method herein is particularly expedient when ozone has been added to a liquid (such as waste water) in the gas-liquid contactor.

In the context of the method, a destruction of residual ozone is carried out first by destroying residual quantities of ozone in the oxygen-containing gas. This can be performed, for example, by guiding the oxygen-containing gas across an electrically heated element or across an aluminum catalytic convertor having manganese and/or copper doping. A reduction of the concentration of hydrocarbons to less than 20 ppm, in particular to 0 to 18 ppm, in particular 1 to 17 ppm, in particular 2 to 16 ppm, in particular 3 to 15 ppm, in particular 4 to 14 ppm, in particular 5 to 13 ppm, in particular 6 to 12 ppm, in particular 7 to 11 ppm, in particular 8 to 10 ppm is performed simultaneously with the destruction of residual quantities of ozone, or so as to follow on from the destruction of residual quantities of ozone. This step is only required when the oxygen-containing gas has a hydrocarbon concentration of more than 20 ppm, or of more than the upper limits of the aforementioned preferred ranges. This reduction of the hydrocarbon concentration can be performed for example by way of oxidation to $CO_2$ by means of oxygen. For this purpose, the oxygen-containing exhaust gas can be guided across a heated catalytic convertor.

A de-humidification of the oxygen-containing gas is performed upon the destruction of residual quantities of ozone or upon the reduction of the hydrocarbon concentration. The de-humidification herein is preferably carried out in such a manner that the dew point of the resulting gas is lower than −80° C., in particular lower than −70° C., in particular lower than −60° C., and most particularly lower than −50° C. In this way, the water content in the resulting gas can be lowered to, for example, 1 to 10 ppm, in particular 2 to 9 ppm, in particular 3 to 8 ppm, in particular 4 to 7 ppm, and most particularly 5 to 6 ppm.

The oxygen concentration in the gas that has been de-humidified in such a manner is subsequently increased to at least 85 percent by volume (% by volume), in particular at least 90% by volume, in particular at least 91% by volume, in particular at least 92% by volume, in particular at least 93% by volume, in particular at least 94% by volume, and most particularly at least 95% by volume, as long as the oxygen-containing gas that results after the preceding steps has an oxygen concentration of less than 85 percent by volume. A suitable range comprises 85% by volume to 99% by volume, or any other range that is formed by the aforementioned numbers. This oxygen re-concentration can be performed by way of $CO_2$ absorption on molecular screens, for example. In particular for the purpose of a comparatively high rate of ozone generation, the $CO_2$ content in the gas that is supplied to the ozone generator should not exceed 10% by volume. In one variant, the oxygen re-concentration during the method is preferably performed in such a manner that the oxygen content (in % by volume) is 85 to 89%, and most preferably 86 to 88%.

The gas that has been de-humidified and enriched with oxygen in this manner is then transferred to an ozone generator where the gas is employed for generating ozone, such that an ozone-containing gas results again. For this purpose, the gas resulting from the treatment process is typically mixed with a further oxygen gas (which typically has a purity of more than 99%, that is to say an oxygen content of more than 99% by volume), such that an oxygen concentration of at least 85% by volume is maintained at all times in the infeed to the ozone generation unit.

Preferred and alternative design embodiments of the fluid distribution device described, of the gas-liquid contactor described, of the method described for adding a gas to a liquid, and of the method described for treating exhaust gas, are combinable with one another in an arbitrary manner, and are capable of being transferred both from the devices to the methods, as well as from the methods to the devices, and to the respective other devices and to the respective other methods.

Further details of the present invention will be explained in more detail by means of exemplary embodiments and the figures which are described hereunder. In the figures.

Figure 1:
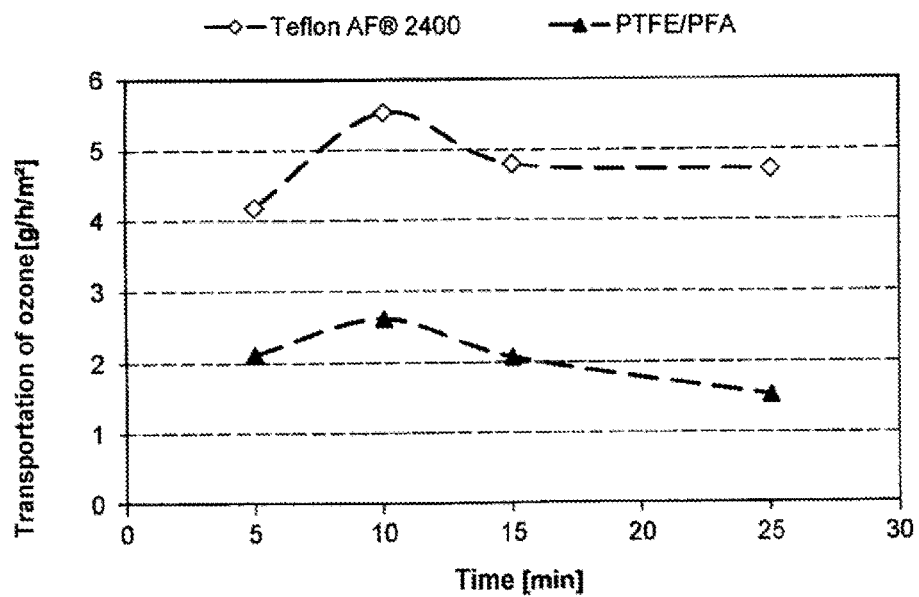
FIG. 1 shows a graph of the transportation of ozone through a porous membrane and a pore-free membrane.

FIG. 1 shows a graph of the transportation of ozone, observed over a specific reaction time, across a membrane in a hollow-fiber membrane contactor. Herein, a hydrophobic porous membrane of PTFE/PFA (filled-in triangles), on the one hand, and a hydrophobic pore-free membrane of Teflon AF 2400 (empty squares), on the other hand, were examined. As can be seen from the illustration of FIG. 1, in almost all stages of the method the transportation of ozone through the pore-free membrane is more than double that of the transportation of ozone through the porous membrane. This shows that Teflon AF 2400 and other comparable pore-free membranes are highly suitable as a material for producing hollow fibers for membrane contactors. Depending on the gas to be transported through the membrane, various materials can be particularly suitable for the construction of the hollow fibers of the membrane contactor herein.

Figure 2:
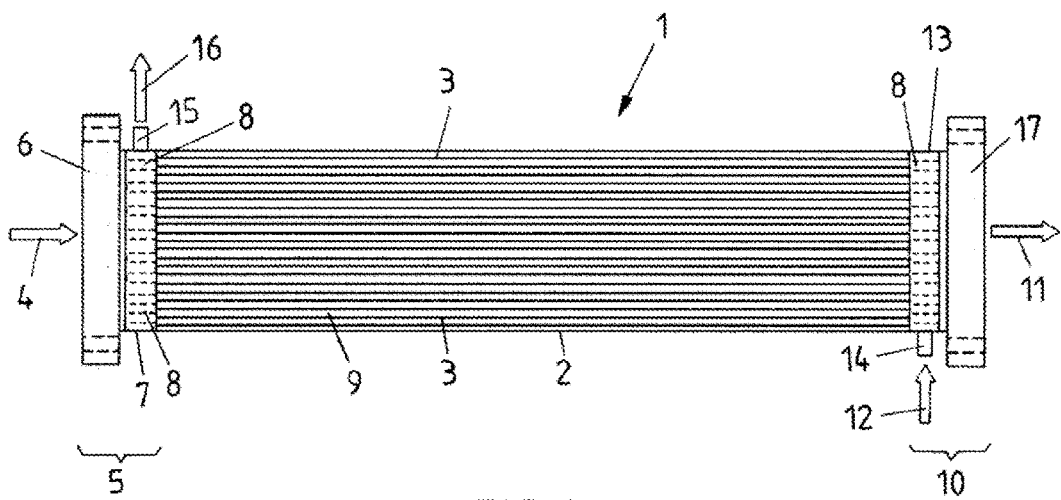
FIG. 2 shows a schematic illustration of an exemplary embodiment of a gas-liquid contactor.

FIG. 2 shows a schematic sectional view through a membrane contactor module 1, as an exemplary embodiment of a gas-liquid contactor. The membrane contactor module 1 has a housing 2, a multiplicity of hollow fibers 3 being distributed uniformly and in a mutually parallel manner in the interior of said housing 2.

A liquid 4 to which a gas is to be added is induced into the membrane contactor module 1 on a liquid inlet side 5 which represents a first end of the membrane contactor module 1. To this end, the liquid 4 to which the gas is to be added first flows through a flange 6 and subsequently through a gas distribution plate 7 which serves as a fluid distribution plate. For this purpose, numerous through bores 8 of which only a few are provided with the respective reference sign are configured in the gas distribution plate 7. The liquid 4 to which the gas is to be added enters a cavity 9 by way of the through bores 8, said cavity 9 being configured between the individual hollow fibers 4. That is to say that the liquid 4 flows about the hollow fibers 3 on the external side of the latter.

The liquid 11 to which the gas has been added then exits the membrane contactor module 1 on a liquid outlet side 10 which corresponds to a second end of the membrane contactor module 1. Moreover, a gas 12 is induced into the hollow fibers 3 of the membrane contactor module 1 on the liquid outlet side 10, said gas 12 flowing in a counter flow to the liquid 4 toward the liquid inlet side 5. The induction of the gas 12 herein is performed at a second gas distribution plate 13 which is constructed identically to the first gas distribution plate 7. The gas 12 by way of a gas connector 14 thus flows into a cavity of the second gas distribution plate 13. Said gas 12 then flows out of this cavity, by way of openings which are in fluid communication with the interior regions of the hollow fibers 3 and are sealed in a gas-tight manner in relation to the interior space 9 of the membrane contactor module 1, into the interior regions of the hollow fibers 3. The gas 12 subsequently flows onward through the hollow fibers 3 up to the first gas distribution plate 7. Said gas 12 there enters a cavity of the first gas distribution plate 7, the gas subsequently leaving said cavity through a gas outlet 15. The gas exiting the gas outlet 15 can also be referred to as the exhaust gas 16.

In order for the membrane contactor module 1 to be able to be readily fitted into an existing pipeline system, the former not only has a first flange 6 on the liquid inlet side 5 but also has a second flange 17 on the liquid outlet side 10. By means of these flanges 6, 17, the membrane contactor module 1 can be integrated in an existing pipeline system without any problems.

Figure 3A:
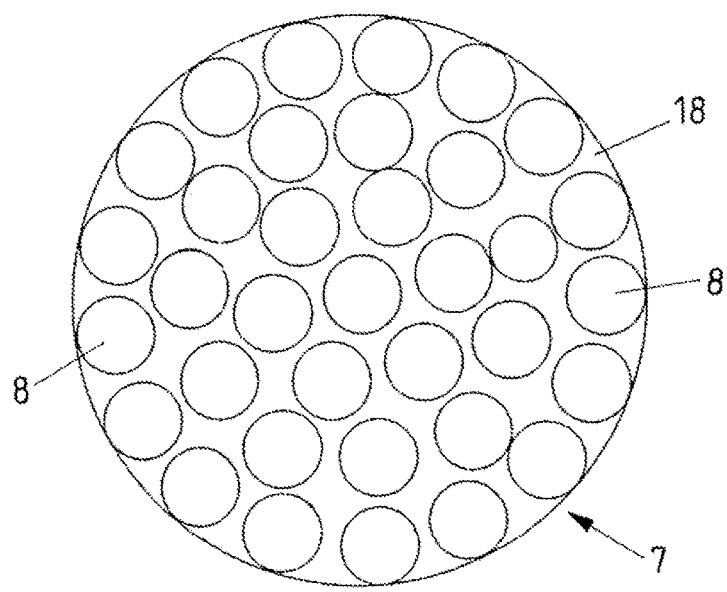
FIG. 3A shows a schematic view of an upper side of an exemplary embodiment of a fluid distribution device.
Figure 3B:
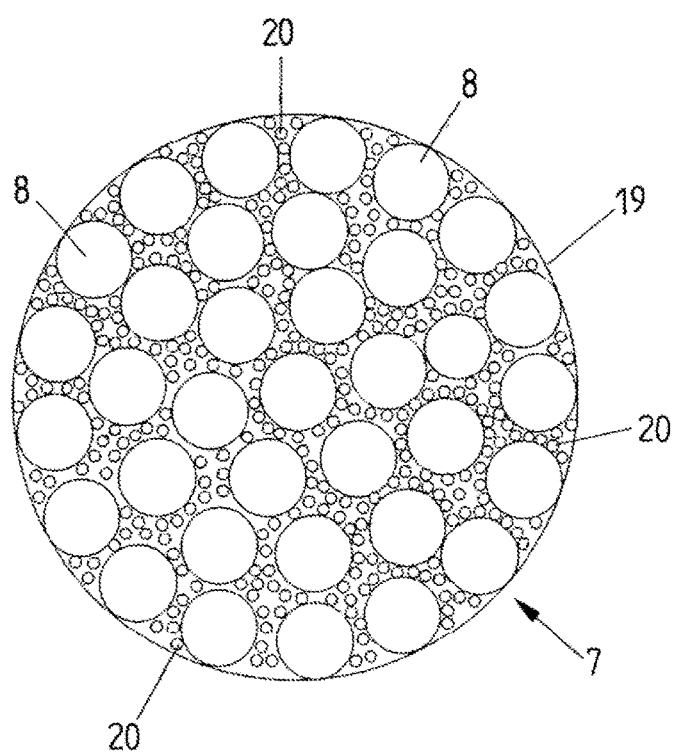
FIG. 3B shows a schematic illustration of a lower side of the exemplary embodiment of the fluid distribution device of FIG. 3A.

The first gas distribution plate 7 that is employed in the membrane contactor module 1 of FIG. 2 is shown in detailed illustrations in FIGS. 3A and 3B. FIG. 3A thus shows an upper side 18 of the gas distribution plate 7, said upper side 18 in the membrane contactor 1 of FIG. 2 being oriented toward the first flange 6. Numerous through bores 8, each having a circular base area, are configured in the upper side 18 which serves as the first side of the gas distribution plate 7. These through bores 8 penetrate the gas distribution plate 7 completely.

FIG. 3B shows a lower side 19 of the gas distribution plate 7. The through bores 8 can also be seen on the lower side 19, since the former penetrate the gas distribution plate 7 completely. A cavity which is in fluid communication with comparatively small openings 20 is configured in the interior of the gas distribution plate 7, between the upper side 18 and the lower side 19. These openings 20, of which again only a few are provided with the respective reference sign, serve for inducing the gas into hollow fibers that are connected to the openings 20, on the one hand, and for receiving the gas that flows out from the hollow fibers and for directing said gas to a gas outlet 15 (cf. FIG. 2) of the gas distribution plate 7, on the other hand. The openings 20 thus are assigned different tasks, depending on the flow direction of the gas.

Figure 4:
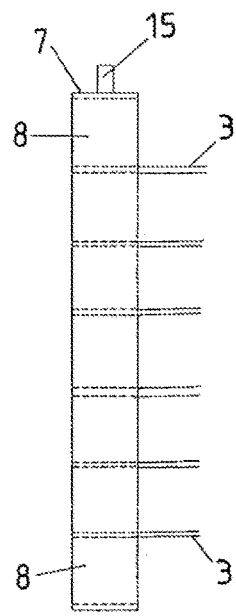
FIG. 4 shows a sectional view through the fluid distribution device of FIGS. 3A and 3B.

FIG. 4 shows a schematic cross-sectional illustration through the first gas distribution plate 7 of the exemplary embodiment of FIG. 2. It can herein be readily seen in this enlarged illustration that the hollow fibers 3 are disposed only in such regions in which openings of the first gas distribution plate 7 are located, said openings connecting the interior region of the hollow fibers 3 to the interior space of the gas distribution plate 7. In this way, gas can flow through the hollow fibers 3 into the interior space of the gas distribution plate 7, and then be guided to the gas outlet 15. By contrast, the through bores 8 are sealed in a fluid-tight manner in relation to the interior space of the gas distribution plate such that a liquid can pass through the through bores 8 into the interior of the membrane contactor 1 (cf. FIG. 2) without coming into direct contact with a gas that is being guided in the interior space of the gas distribution plate 7.

Figure 5:
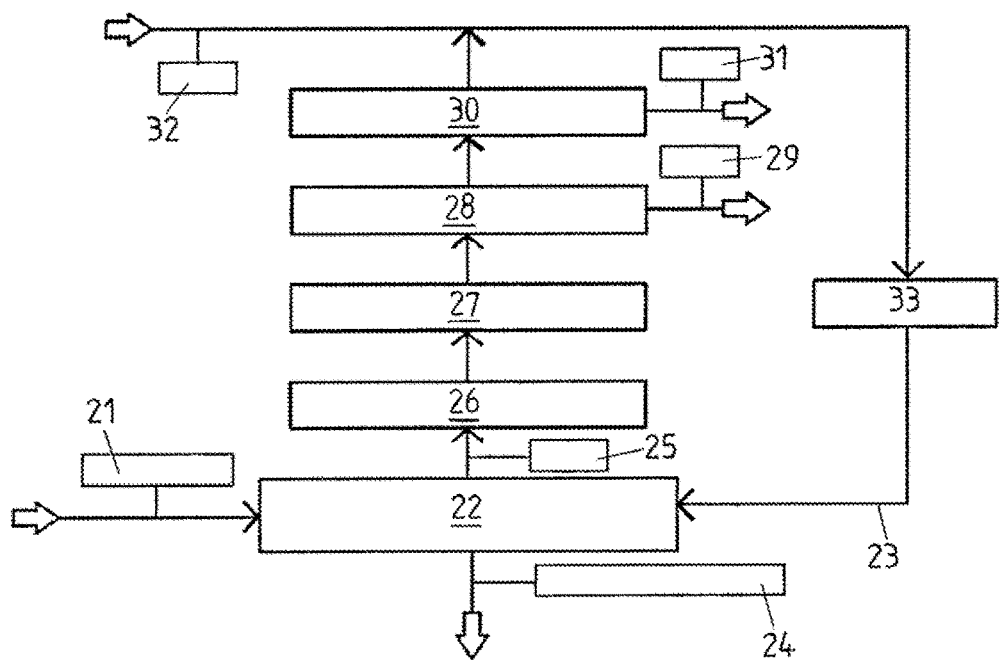
FIG. 5 shows a schematic flow diagram of an exemplary embodiment of a method for treating exhaust gas.

FIG. 5 shows a schematic flow diagram of a method for treating exhaust gas according to the prior art, said exhaust gas exiting from a gas-liquid contactor and containing oxygen. The example of FIG. 5 herein relates to the recovery of oxygen-containing exhaust gas from a method in which a liquid is exposed to ozone.

First, a liquid 21 that is to be exposed to ozone is introduced into an ozone gas-liquid contact apparatus 22. Moreover, an ozone-containing gas 23 is introduced into this ozone gas-liquid contact apparatus 22. A liquid phase 24 that has been exposed to ozone can now be removed from the ozone gas-liquid contact apparatus 22. Moreover, however, exhaust gas 25 is also produced, said exhaust gas 25 representing an oxygen-containing gas since not all of the oxygen has transitioned from the ozone-containing gas 23 to the liquid phase in the ozone gas-liquid contact apparatus 22. A residual-ozone destruction 26, that is to say a destruction of residual quantities of ozone, is now carried out in the exhaust gas 25. A hydrocarbon elimination 27 by reducing the hydrocarbon concentration to less than 20 ppm of hydrocarbons in the exhaust gas 25 is subsequently performed. Drying 28 of the exhaust gas is now carried out, wherein water 29 is removed from the exhaust gas 25. An oxygen re-concentration 30 is subsequently performed, wherein $CO_2$ 31 is precipitated. The re-concentration results in the oxygen concentration being increased to 85% by volume. Now the exhaust gas that in this manner has been purified, dried, and enriched with oxygen is supplied to a gas flow of pure oxygen 32 and guided to an ozone generator 33. Ozone is generated therein such that ozone-containing gas 23 is re-created which can be employed for ozonization in the ozone gas-liquid contact apparatus 22.

The ozone gas-liquid contact apparatus 22 is designed as a membrane contactor. The membrane herein represents a barrier to water vapor and to organic substances which are contained in the form of particulate or dissolved matter in the liquid 21 to which the ozone gas is to be added. Increased purity of the exhaust gas 25 as compared to other gassing devices thus results. Consequently, the subsequent treatment of exhaust gas can also be performed in a more economical manner.

Significantly fewer deposits are formed on the electrodes of the ozone generator 33 on account of the elimination of hydrocarbons, which is why the service life of this ozone generator 33 is substantially increased. The precipitation of $CO_2$ in the step of oxygen re-concentration 30 also contributes toward the latter.

The invention claimed is:

1. A method for adding a gas to a liquid, using a gas-liquid contactor having a housing in which a multiplicity of hollow fibers are disposed and a space that surrounds the hollow fibers is configured, the method comprising the following steps:
   introducing a liquid to which gas is to be added into the space which surrounds the hollow fibers of the gas-liquid contactor,
   introducing a gas into the hollow fibers of the gas-liquid contactor,
   allowing the liquid to which gas is to be added and the gas to flow in the gas-liquid contactor, and
   obtaining a liquid to which gas has been added,
   wherein the liquid to which gas is to be added and the gas flow through the gas-liquid contactor in counter flow and
   wherein the gas-liquid contactor comprises a fluid distribution device, wherein the fluid distribution device comprises a first side and a second side; a multiplicity of through bores which extend from the first side to the second side and through which the liquid to which gas is to be added flows; an interior space which is delimited by the first side and by the second side and which is designed to be fluid-tight in relation to the through bores; a multiplicity of openings which connect the interior space to the second side; and a fluid connector through which the gas is introduced into the interior space or discharged from the interior space.

2. The method as claimed in claim 1, wherein a liquid pressure of the liquid to which gas is to be added is higher than a gas pressure of the gas, if and when the hollow fibers have a membrane having a porous hydrophobic material.

3. The method as claimed claim 1, wherein a liquid pressure of the liquid to which gas is to be added is lower than a gas pressure of the gas, if and when the hollow fibers have a membrane having a pore-free and gas-permeable hydrophobic material.

4. The method as claimed in claim 1, wherein the liquid to which gas is to be added is a liquid to be exposed to ozone, and in that the gas is an ozone-containing gas.

5. The method as claimed in claim 4, wherein the ozone-containing gas which exits from the fluid connector from the gas-liquid contactor still comprises large quantities of non-utilized oxygen is so that it is an oxygen-containing gas, wherein the oxygen-containing gas is subject to an exhaust gas treatment comprising the following steps:
   destroying residual quantities of ozone in the oxygen-containing gas;
   if and when the oxygen-containing gas has a hydrocarbon concentration of more than 20 ppm: reducing the concentration of hydrocarbons in the oxygen-containing gas to less than 20 ppm;
   de-humidifying the oxygen-containing gas;
   increasing the oxygen concentration in the de-humidified oxygen-containing gas to at least 85 percent by volume;
   transferring the gas that has been de-humidified and enriched with oxygen to an ozone generator where the gas is employed for generating ozone, such that an ozone-containing gas results again.

6. The method as claimed in claim 1, wherein the first side and the second side of the fluid distribution device each have a circular-type base area.

7. The method as claimed in claim 1, wherein the through bores of the fluid distribution device have a diameter which is larger than a diameter of the openings.

8. The method as claimed in claim 1, wherein the fluid connector of the fluid distribution device is disposed on a lateral circumference of the fluid distribution device.

9. The method as claimed in claim 1, wherein the gas-liquid contactor extends along a direction of longitudinal extent, from a first end to a second end, and the fluid distribution device is disposed on the first end or on the second end of the gas-liquid contactor.

10. The method as claimed in claim 1, wherein the gas-liquid contactor has two fluid distribution devices, wherein the one fluid distribution device is disposed on the first end and the other fluid distribution device is disposed on the second end.

11. The method as claimed in claim 1, wherein two flanges which are in each case disposed on a side of the fluid distribution device that in the direction of longitudinal extent of the gas-liquid contactor is outboard and which serve for connecting the gas-fluid contactor to a line system.

12. The method as claimed in claim 1, wherein the fluid distribution device is disposed in such a manner that the through bores of the fluid distribution device are in fluid communication with the space that surrounds the hollow fibers, and in that the openings of the fluid distribution device are in fluid communication with an interior region of the hollow fibers.

13. The method as claimed in claim 1, wherein the hollow fibers have a membrane having a porous hydrophobic material.

14. The method as claimed in claim 1, wherein the hollow fibers (3) have a membrane having a pore-free and gas-permeable hydrophobic material.

* * * * *